Jan. 13, 1925.
W. J. SPIRO
DISK BRAKE
Filed Sept. 24, 1923
1,523,304
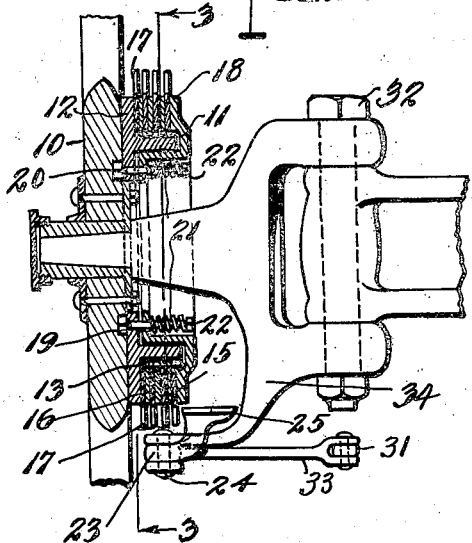
Inventor
Walter J. Spiro
Witness.

Patented Jan. 13, 1925.

1,523,304

UNITED STATES PATENT OFFICE.

WALTER J. SPIRO, OF WHITE PLAINS, NEW YORK.

DISK BRAKE.

Application filed September 24, 1923. Serial No. 664,447.

*To all whom it may concern:*

Be it known that I, WALTER J. SPIRO, citizen of the United States, residing at White Plains, in the county of Westchester and State of New York, have invented certain new and useful Improvements in Disk Brakes, of which the following is specification.

This invention relates to a disk brake and particularly to a construction comprising frictionally contacting members one of which is adapted to be held against rotation while the cooperating member is positively driven.

The invention has for an object to present a novel and improved construction embodying a positively driven brake member mounted for axial movement and a cooperating freely rotatable member axially movable into frictional contact with the driven member, together with means for retaining the free member against rotation.

A further object of the invention is to present a structure comprising a series of disks keyed upon a support for axial movement thereon and a cooperative series of freely rotatable disks held under tension in frictional contact therewith, and means for retaining one or more of the freely rotatable disks from rotation.

Another object of the invention is to provide a novel form of wheel brake comprising a hub having a series of disks keyed thereon for axial movement and an alternating series of disks freely mounted for rotary and axial movement upon the hub, all of said disks being adjustably tensioned into frictional contact with each other, and adjustable means for engaging the periphery of one or more of the freely mounted disks.

Other and further objects and advantages of the invention will be hereinafter set forth and the novel features thereof defined by the appended claims.

In the drawing—

Figure 1 is a vertical section;

Figure 2 is a bottom plan;

Figure 3 is a section on line 3—3 of Figure 1;

Figure 4 is an elevation of the freely mounted disk;

Figure 5 is a similar view of the driven disk; and

Figure 6 is a diagrammatic plan of the brake arrangement for a four wheel brake system.

Like numerals refer to like parts in the several figures of the drawing.

This invention is designed for application to various constructions of brake mechanism, but for the purpose of illustration is herein disclosed as assembled for a four wheel vehicle brake. In this form the wheel 10 has secured thereto a hub member 11 by means of a flange 12, and this hub is provided upon its periphery with one or more keys or projections 13 adapted to engage the lugs 14 projecting into the central aperture of the driven disk member 15. By this means the disk is positively driven with the hub but is capable of axial movement thereon. A series of these disks are provided and alternating therewith freely mounted disks 16 are mounted upon the hub for rotary and axial movement. The central aperture 16ª of the disks 16 is of sufficient diameter to ride over the keys 13 and the periphery of such disks is formed with stop lugs 17 extended beyond the periphery of the driven disks. The two series of disks are clamped and held in frictional contact sufficient for braking purposes by any desired means, such as a clamping plate 18 to engage the outer disk and having an inset flange 19 opposite the flange 12 and held under yielding tension by bolts 20 passing therethrough. A suitable number of these bolts are provided to secure an even tension circumferentially of the disks, and each bolt is provided with a tension spring 21 disposed between the flange 19 and an adjustable nut member 22 by which the frictional braking tension may be regulated to the desired degree.

The structure before described is bodily rotatable with the wheel in its movement and for the purpose of the braking action one or more of the freely mounted disks is held against such movement by any preferred means. A desirable form of such means comprises a stop arm 23 pivoted at 24 and having a flange 25 disposed to successively swing into the path of the stop lugs upon the periphery of the series of freely mounted disks to retain the same against rotation which effects a frictional resistance between the contacting faces of the driven and loose disks. The use of such disks provides a compact assemblage having an extended area of frictional contact on the opposite faces of each disk and the braking resistance between the disks may be accurately adjusted to the required degree for the character of vehicle and its load.

In applying the invention to a four wheel brake the stop arms 23 for the rear wheel brakes may be provided with an operating lever 26 from which connecting rods or cables 27 extend to arms 29 upon a brake shaft 28 adapted to be operated by a brake pedal or lever 30 in the ordinary manner. From two of such arms the connections 31 extend to the front wheel brakes which must be mounted to permit the steering movement without affecting the brake relations. This may be accomplished by disposing the pivot 24 for the stop arm upon a bracket 34 from the steering knuckle and providing the levers 33 which extend into alignment with the king bolt 32 and receive the rod connections 31. By this arrangement an operation of the brake pedal simultaneously actuates the several stop arms to the same degree to secure an equal braking action upon all wheels. Under some conditions it may be desired to vary such action and this may be accomplished by an adjustment of the brake tension or applying more or less of the disks to the wheels.

The stop arm may be restored to inoperative position by any desired means, such as a spring 35, and when used in connection with the ordinary brake pedal or lever the usual restoring spring for such element assists in that function.

The operation of the invention will be apparent from the foregoing description and it will be seen that no equalizers are required in the brake rods as such equalization is attained by adjustment of the frictional tension springs. The successive engagement with the disks effects a progressive increase in braking force or retardation as the amount of frictional resistance to the revolution of the wheel may be accurately determined by the number of disks held against rotation. The tension springs may be set to apply an equal braking force to each wheel when an equal number of disks are held, or lighter springs may be used for the front wheels so that the braking effort thereon is proportionately less than that upon the rear wheels. There is no friction between the parts when the brake is not applied so that all drag and wear is avoided, while only the power necessary to move the stop arm into engagement with the disks is required to apply the brake with maximum force. The invention is adapted for ready application to existing constructions of motor car at a very low cost and secures the most efficient results in its operation.

The details of one form of this brake have been specifically shown and described, but the invention is not confined thereto, as changes and alterations may be made therein without departing from the spirit of the invention as recited in the following claims.

What I claim is:—

1. A wheel provided with a brake support, a series of friction members secured for rotation therewith, a cooperating series of friction members freely rotatable upon the support but normally frictionally retained by the secured members, and an actuating member fixed against revolution upon the chassis of a vehicle and movable to engage said rotatable members.

2. In a brake, a wheel, an axle therefor provided with a king bolt, a positively rotated member secured to the wheel, a freely rotatable member mounted for movement relative thereto, means for tensioning said members into frictional contact, and means for retaining the free member from rotation and having an operating connection in substantial alinement with said king bolt.

3. A wheel provided with a brake support, a series of friction disks keyed thereto, a series of cooperating disks rotatable upon the support, and an actuating arm fixed against revolution upon an axle member of a vehicle and reciprocable to engage and hold said rotatable disks.

4. In a disk brake, a wheel hub having a series of disks keyed thereon for axial movement, an alternating series of disks freely mounted for rotary and axial movement upon the hub, means for tensioning said disks into frictional contact with each other, and adjustable means fixed against revolution upon the chassis of a vehicle for engaging the periphery of one or more of the freely mounted disks to retain the same against rotation.

5. In a disk brake, a pivoted axle, a wheel upon said axle having a series of disks keyed thereon for axial movement, an alternating series of disks freely mounted for rotary and axial movement upon the wheel, means for tensioning said disks into frictional contact with each other, and a stop arm fixed against revolution upon said axle and pivoted thereon to engage projections upon the periphery of one or more of said freely mounted disks to retain the same against rotation.

6. In a disk brake, a drum secured at the hub of a wheel and provided with a series of disks keyed thereon for axial movement, an alternating series of freely rotatable disks axially movable upon the drum, a pressure plate bearing against the outer disk of the series, circumferentially disposed retaining bolts passing through a flange of said plate, tensioning springs upon said bolts engaging said flange, adjustable nuts on the bolts for determining the tension of said springs, and means for retaining the freely rotatable disks against rotary movement.

7. In a disk brake, a drum secured at the hub of a wheel, alternating series of positively and freely rotatable disks mounted thereon, a bearing flange at the inner end of said drum, a pressure plate extending over the outer end of said drum and engaging the assembled disks, an inset portion from said plate entering said drum and provided with a flange, and a circumferential series of tensioning means extending from the drum flange and bearing upon the plate flange.

8. A wheel provided with a brake support, a series of friction members secured for rotation therewith, a cooperating series of friction members freely rotatable upon the support but normally frictionally retained by the secured members, and an actuating member fixed against revolution upon the chassis of a vehicle and movable to selectively engage one or more of said rotatable members.

9. In a four wheel brake, an assembled series of positively rotated and freely rotatable disks held in frictional contact and disposed to control each wheel, a stop arm for each disk series fixed against revolution upon the chassis of a vehicle and arranged to engage the freely rotatable disks, a lever from said arm, a brake shaft and operating means, and brake rods extending from the brake shaft to said arm levers.

10. In a four wheel brake, an assembled series of positively rotated and freely rotatable disks held in frictional contact and disposed to control each front wheel, a steering knuckle for said wheel having a bracket extended toward said disks, a crank lever pivoted upon said bracket and having stop means to engage the freely rotatable disks, and a brake rod connection with said lever having a pivot in substantially axial alinement with the pivot of the steering knuckle.

In testimony whereof I affix my signature.

WALTER J. SPIRO.